(12) United States Patent
Heath et al.

(10) Patent No.: US 7,814,340 B2
(45) Date of Patent: Oct. 12, 2010

(54) POWER MANAGEMENT MECHANISM IN SYSTEM FOR SUPPLYING POWER OVER COMMUNICATION LINK

(75) Inventors: Jeffrey Lynn Heath, Santa Barbara, CA (US); David McLean Dwelley, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 1008 days.

(21) Appl. No.: 11/444,435

(22) Filed: Jun. 1, 2006

(65) Prior Publication Data

US 2007/0136614 A1 Jun. 14, 2007

Related U.S. Application Data

(60) Provisional application No. 60/749,048, filed on Dec. 12, 2005.

(51) Int. Cl.
*G06F 1/26* (2006.01)
*G06F 1/32* (2006.01)

(52) U.S. Cl. .................. 713/300; 713/320; 713/330; 713/340; 700/286; 700/287; 700/295

(58) Field of Classification Search .............. 713/300, 713/320, 330, 340; 700/286, 287, 295
See application file for complete search history.

(56) References Cited

U.S. PATENT DOCUMENTS 5,752,046 A * 5/1998 Oprescu et al. ............. 713/300

| | | | |
|---|---|---|---|
| 6,473,608 B1 | 10/2002 | Lehr et al. | |
| 7,203,849 B2* | 4/2007 | Dove | 713/300 |
| 7,337,336 B2* | 2/2008 | Ferentz et al. | 713/300 |
| 7,353,407 B2* | 4/2008 | Diab et al. | 713/300 |
| 7,383,451 B2* | 6/2008 | Matsushima et al. | 713/300 |
| 7,444,526 B2* | 10/2008 | Felter et al. | 713/300 |
| 2003/0146765 A1 | 8/2003 | Darshan et al. | |
| 2004/0073597 A1 | 4/2004 | Caveney et al. | |
| 2004/0123172 A1* | 6/2004 | Sheller | 713/323 |
| 2004/0164619 A1 | 8/2004 | Parker et al. | |
| 2005/0080516 A1 | 4/2005 | Pincu et al. | |

OTHER PUBLICATIONS

International Search Report and Written Opinion issued in corresponding International Patent Application No. PCT/US2006/039273, mailed Feb. 20, 2007.

International Search Report and Written Opinion issued in corresponding International Patent Application No. PCT/US2006/043547, mailed Mar. 2, 2007.

(Continued)

*Primary Examiner*—Thomas Lee
*Assistant Examiner*—Michael J Brown
(74) *Attorney, Agent, or Firm*—McDermott Will & Emery LLP

(57) ABSTRACT

System and methodology for managing power supplied to powered devices over communication links, such as Ethernet links. A power supply system has multiple power supply ports for providing power to respective powered devices via multiple communication links. A power-in-use bus shared by the multiple power supply ports is configured for receiving a power-in-use signal representing total amount of power being used by the powered devices. Multiple port control circuits associated with the power supply ports are responsive to the power-in-use signal for controlling supply of power to the respective powered devices.

23 Claims, 3 Drawing Sheets

OTHER PUBLICATIONS

IEEE Computer Society: 802.3af, "Part 3: Carrier Sense Multiple Access with Collision Detection (CSMA/CD) Access Method and Physical Layer Specifications Amendment: Data Terminal Equipment (DTE) Power via Media Dependent Interface (MDI)," IEEE Standards, Jun. 18, 2003, p. 1-121, The Institute of Electrical and Electronics Engineers, Inc, New York, New York.

Rohrmoser, M. et al., "Digital Connect ME Technical Product Specification," Jul. 2003, p. 1-7, UK, URL: http://www.entrix.co.uk/connect/data/digiConnectME_techprdspec.pdf.

"IntelliJack Switch Produktreihe," Aug. 2003, p. 1-4, URL: www.3com.de/pdf/intel_switch.pdf.

Linear Technology, "LTC4259A, Quad IEEE 802.3af Power over Ethernet Controller with AC Disconnect" [Online, http://www.chipcatalog.com/Linear/LTC4259A.htm] 2003, pp. 1-32.

International Search Report for Corresponding Application No. PCT/US2006/045242 Mailed Mar. 14, 2007.

Cisco Systems, "Power over Ethernet: Cisco Inline Power and IEEE 802.3af" [Online, http://www.cisco.com/warp/public/cc/so/neso/bbssp/poeie_wp.pdf] 2004, pp. 1-13.

International Search Report for Corresponding Application No. PCT/US2006/047218 Mailed Apr. 5, 2007.

* cited by examiner

POWER MANAGEMENT MECHANISM IN SYSTEM FOR SUPPLYING POWER OVER COMMUNICATION LINK

This application claims priority of provisional U.S. patent application No. 60/749,048 filed on Dec. 12, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitries and methodologies for managing power in a Power over Ethernet (PoE) system.

Background Art

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

PSE's main functions are to search the link for a PD requesting power, optionally classify the PD, supply power to the link if a PD is detected, monitor the power on the link, and disconnect power when it is no longer requested or required. A PD participates in the PD detection procedure by presenting detection and classification signatures to request power and indicate its power level class. The PD detection signature has electrical characteristics measured by the PSE.

If the detection signature is valid, the PD has an option of presenting a classification signature to the PSE to indicate how much power it will draw when powered up. Based on the determined class of the PD, the PSE applies the required power to the PD.

In multi-port PSE systems, it is often the case that only a few of the ports require the maximum power available. PSE system vendors often opt to design systems were the maximum PSE power supply output is insufficient to power all ports at maximum power.

When the PD presents its classification signature, it may indicate the maximum amount of power it will use. U.S. patent application Ser. No. 10/991,409 entitled "ANALOG POWER MANAGEMENT WITHIN POWER OVER ETHERNET SYSTEM" filed on Nov. 19, 2004 and assigned to Linear Technology Corporation, the assignee of the present application, describes a single-wire analog Power Management Bus (PMB) that may determine whether the addition of a newly connected PD could result in exceeding the capabilities of the PSE system power supply. The PMB allocates power on a first come, first serve basis. However, it would be beneficial to provide power allocation on a priority basis.

In addition, it would be beneficial to enhance the PMB by taking into account the actual power in use, to provide power management based on priorities of PDs.

Further, it would be desirable to dynamically change the amount of power the PSE system has at any given time, based on such factors as the temperature of the power supply, and/or a system change, for example, when an Uninterruptible Power Supply (UPS) takes over due to a utility power failure, or a cooling fan failure.

Moreover, it would be desirable to provide power management operations using low-cost circuitry, with no software required.

SUMMARY OF THE DISCLOSURE

The present disclosure offers a novel system and methodology for managing power supplied to powered devices over communication links, such as Ethernet links. In accordance with one aspect of the disclosure, a power supply system comprises multiple power supply ports for providing power to respective powered devices via multiple communication links. A power-in-use bus shared by the multiple power supply ports is configured for receiving a power-in-use signal representing total amount of power being used by the powered devices. Multiple port control circuits associated with the power supply ports are responsive to the power-in-use signal for controlling power supply to the respective powered devices.

In particular, a port control circuit may remove power from the respective port when the power-in-use signal exceeds a preset usage threshold level. The power may be managed based on priorities of the powered devices so as to remove power supplied to a lower priority powered device before removing power supplied to a higher priority powered device.

Further, a port control circuit may deny a request for power from a respective powered device when the power-in-use signal exceeds a preset usage threshold level.

The system further may comprise a power allocation bus shared by the multiple power supply ports and configured for receiving a power allocation signal representing a total amount of power allocated for the powered devices.

The ports control circuits may be responsive to the power allocation signal for controlling power supply to the respective powered devices. In particular, a port control circuit may remove power supplied to a respective powered device when the power allocation signal exceeds a preset allocation threshold level. Power supplied to a lower priority powered device may be removed before removing power from a higher priority powered device.

Also, a port control circuit may deny a request for power from the respective powered device when the power allocation signal exceeds a preset allocation threshold level.

In accordance with an embodiment of the disclosure, the power-in-use bus may be coupled to a power-in-use impedance common for the multiple power supply ports. The power allocation bus may be coupled to a power allocation impedance common for the multiple power supply ports. A value of the power allocation impedance may be set smaller than the value of the power-in-use impedance.

A signal modification mechanism may be provided for modifying the power-in-use signal and/or the power allocation signal in response to an event. In particular, the power-in-use signal and/or the power allocation signal may be changed to effectively change power available from the power supply system.

In accordance with another aspect of the disclosure, a PoE system may comprise multiple PoE ports for supplying power to respective powered devices. The ports may be assigned with priorities corresponding to priorities of the respective powered devices. A power indication bus shared by the multiple PoE ports may be configured to receive a power indication signal indicating total power allocated to or used by the powered devices. Multiple port control circuits associated with the multiple power supply ports may be responsive to the power indication signal for controlling power supply to the respective powered devices in accordance with the priorities of the powered devices.

The power indication signal may include a power-in-use signal representing total power being used by the powered devices, and/or a power allocation signal representing a total power allocated to the powered devices.

In accordance with a method of the present disclosure, the following steps are carried out for supplying power from multiple power supply ports to respective powered devices over communication links:

detecting a powered device linked to a power supply port of the multiple power supply ports, determining amount of power demanded by the powered device, placing a power demand signal representing the demanded power onto a power allocation bus shared by the multiple power supply ports, determining a priority of the detected powered device, detecting on the power allocation bus, a total power allocation signal representing a total amount of power allocated to the powered devices, and if the total power allocation signal exceeds a preset power allocation threshold level, denying a request for power from the detected powered device after expiration of a time interval corresponding to the priority of the detected powered device.

The method may further include the steps of:

detecting on a power-in-use bus shared by the multiple power supply ports, a power-in-use signal representing a total amount of power being used by the powered devices, and if the power-in-use signal exceeds a preset power-in-use threshold level, denying the request for power from the detected powered device after expiration of the time interval corresponding to the priority of the detected powered device.

In accordance with another method of the present disclosure, the following steps are carried out for supplying power from multiple power supply ports to respective powered devices over communication links:

detecting on a power-in-use bus shared by the multiple power supply ports, a power-in-use signal representing a total amount of power being used by the powered devices, and if the power-in-use signal exceeds a preset power-in-use threshold level, removing power supplied to a powered device having a lowest priority among powered devices currently supplied with power.

The method further may comprise the steps of:

detecting on a power allocation bus shared by the multiple power supply ports, a total power allocation signal representing a total amount of power allocated to the powered devices, and if the total power allocation signal exceeds a preset power allocation threshold level, removing power supplied to the powered device having the lowest priority.

The power may be removed after expiration of a time interval corresponding to the priority of the powered device.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a power supply device in a Power over Ethernet (PoE) system. It will become apparent, however, that the concepts described herein are applicable to any power supply system for providing power to multiple loads. For example, the system of the present disclosure may be provided in a local area network (LAN) having a plurality of nodes, a network hub and communication cabling connecting the nodes to the network hub for providing data communications. The network hub may include a power supply device for providing power to multiple loads over the communication cabling. The power supply device may have a power management mechanism of the present disclosure.

Figure 1:
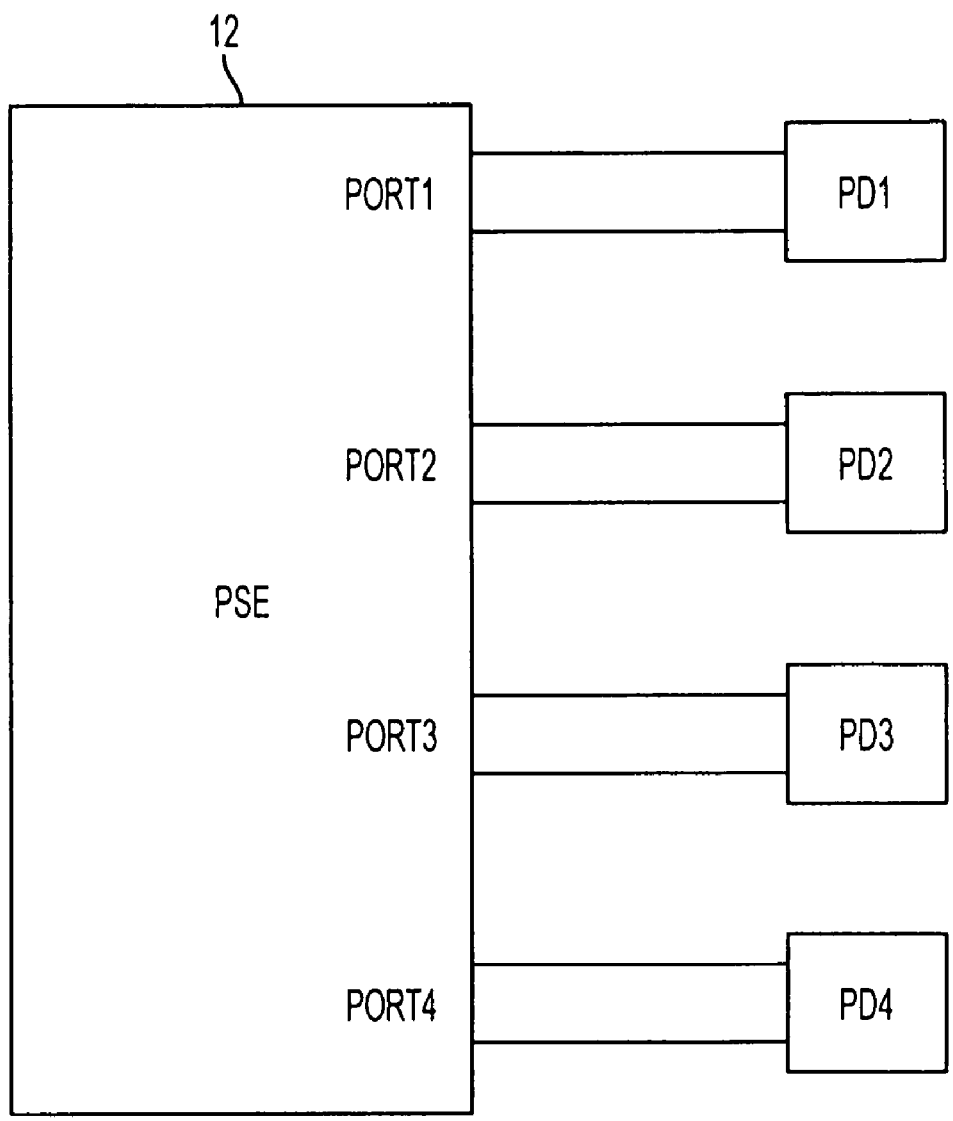
FIG. 1 is a diagram illustrating a PoE system of the present disclosure.

FIG. 1 shows a simplified block-diagram illustrating a PoE system 10 including Power Sourcing Equipment (PSE) 12 having multiple PoE ports 1 to 4 connectable to Powered Devices (PD1 to PD4) via respective links, each of which may be provided using 2 or 4 sets of twisted pairs within an Ethernet cable. Although FIG. 1 shows four ports of the PSE 12, one skilled in the art would realize that any number of ports may be provided. The PSE 12 may be provided based on one or more PSE chips having multiple output ports.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

Figure 2:
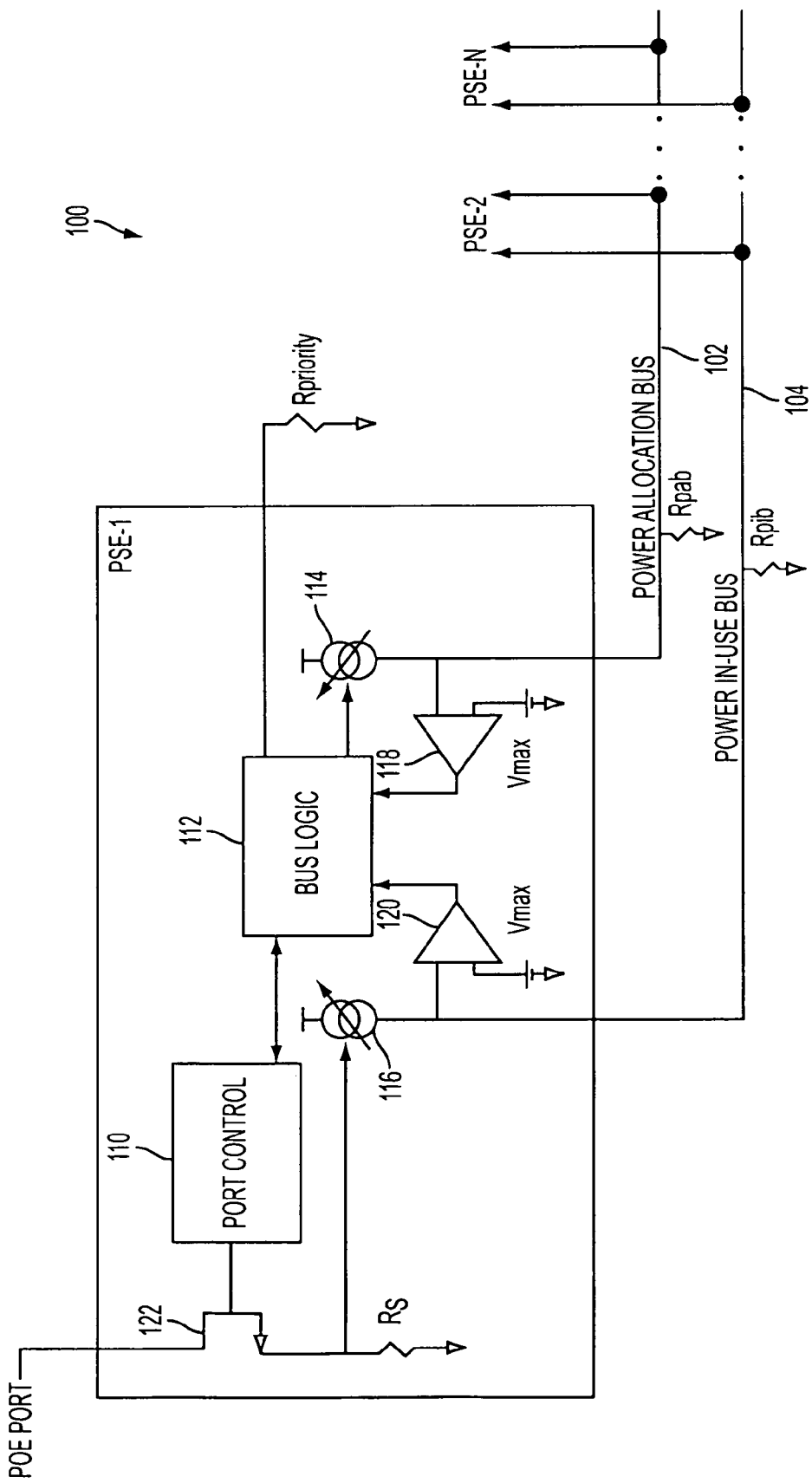
FIG. 2 is a diagram illustrating an exemplary power management mechanism of the present disclosure.

As shown in FIG. 2, a power management mechanism 100 of the present disclosure includes a single power allocation bus (PAB) 102 and a single power-in-use bus (PIB) 104 shared by multiple PSE channels PSE-1, PSE-2, ..., PSE-N. Each of the PSE channels is associated with the respective PoE port of the PSE 12. One skilled in the art would realize that several PSE channels may be provided on a PSE chip. Alternatively, each PSE channel may be provided on a separate chip.

As discussed in more detail below, the PAB 102 is used for determining whether power allocated to PDs does not exceed the maximum power available from the multi-channel power supply system. The PIB 104 allows the power management mechanism 100 to monitor actual power being used by PDs.

Each of the PSE channels PSE-1, PSE-2, ..., PSE-N may include a port controller 110, a bus logic 112, current sources 114 and 116, comparators 118 and 120, a switching device 122, a sense resistor Rs, and a priority resistor Rpriority. The port controller 110 may control PoE operations associated with the respective PoE port. In particular, the port controller 110 controls switching of the switching device 122, such as a MOSFET or a bipolar transistor, to supply power to the respective PoE port or to remove power supplied to this port. Also, the port controller may support detection and classification procedure prescribed by the IEEE 802.3af standard. Alternatively, a common PSE controller may control PoE operations for several PSE channels.

The bus logic 112 may support interface of the respective PSE channel to the PAB 102 and PIB 104. Current sources 114 and 116 may produce PAB and PIB currents placed by the respective PSE channel onto the PAB 102 and PIB 104. As described in more detail below, the PAB current represents power demanded by a PD linked to the respective PSE channel. The PAB current may be defined by the port controller 110 based on a class presented by the PD. The PIB current represents actual power used by a PD linked to the respective PSE channel. The PIB current may be determined by a sense voltage produced across the sense resistor Rs.

Comparators 118 and 120 may compare PAB and PIB voltages with the prescribed maximum voltages Vmax preset for the PAB 102 and PIB 104. The maximum voltages Vmax may represent maximum power available from the multi-port PSE for all PoE ports. Although FIG. 2 shows separate voltage supplies for each voltage Vmax, one skilled in the art would realize that a single source of Vmax may be used for several PSE channels.

The PAB voltage is produced across resistor Rpab common for all PSE channels. The PIB voltage is produced across resistor Rpib, which is also common for all PSE channels. The PIB 104 may be programmed to match the capabilities of a particular power supply coupled to the multi-port PSE by choosing a value for the resistor Rpib as follows:

$Rpib = Vmax/(S_{p-to-I} \times P)$, where $S_{p-to-I}$ is a coefficient defining the conversion from PoE link power to bus current, and P is the maximum power of the multi-port power supply.

The coefficient $S_{p-to-I}$ corresponds to a ratio between the PIB current placed on the bus by the PSE channel and the power on a PoE link corresponding to this current. For example, if the PSE channel places 1 mkA of current to represent 1 W of power used by a PD, and $V_{MAX}=1V$, then a PSE device with a 200 W power supply would use $R_{BUS}=1V/(1\mu A/W \times 200 W)=5$ kOhms.

The value of the resistor Rpab may be set lower than the value of the resistor Rpib to intentionally over allocate power because the power used by a PD may often be lower that its maximum allocated power. For example, Rpib=1.5÷2.0 Rpab. In this case, the PIB 104 would prevent the actual maximum value of the power supply from being exceeded. One skilled in the art would realize that any impedance circuitry may be utilized instead of resistors Rpib and Rpab. For example, diodes may be used.

Alternatively, the PAB voltage and the PIB voltage may be compared with different threshold levels established to define required relationship between the allocated power and the used power.

The value of the priority resistor Rpriority may be set to assign a priority of the respective PoE port corresponding to the priority of the PD linked to that port. One skilled in the art would realize that any other means, such as digital programming pins, may be used to assign a priority of a PoE port. The priority of a PoE port may be determined by functions performed by the respective PD, and may be modified to reflect a change in PD's functions.

Each of the PoE port is associated with a timer corresponding to the priority of the port. In particular, a timer associated with a PoE port with a higher priority is set to define a longer time interval that a timer associated with a PoE port with a lower priority. As discussed in more detail later, the timers may be turned on when total allocated power defined by the PAB voltage or total used power defined by the PIB voltage exceeds the maximum power available from the multi-channel power supply system. As a time interval defined by timers associated with PDs having a lower priority will expire before a time interval defined by timers associated with PDs having a higher priority, the PDs having a lower priority will be disconnected or denied power before the PDs having a higher priority. As one skilled in the art would realize, the timers may be implemented using various software or hardware timing means.

Figure 3:
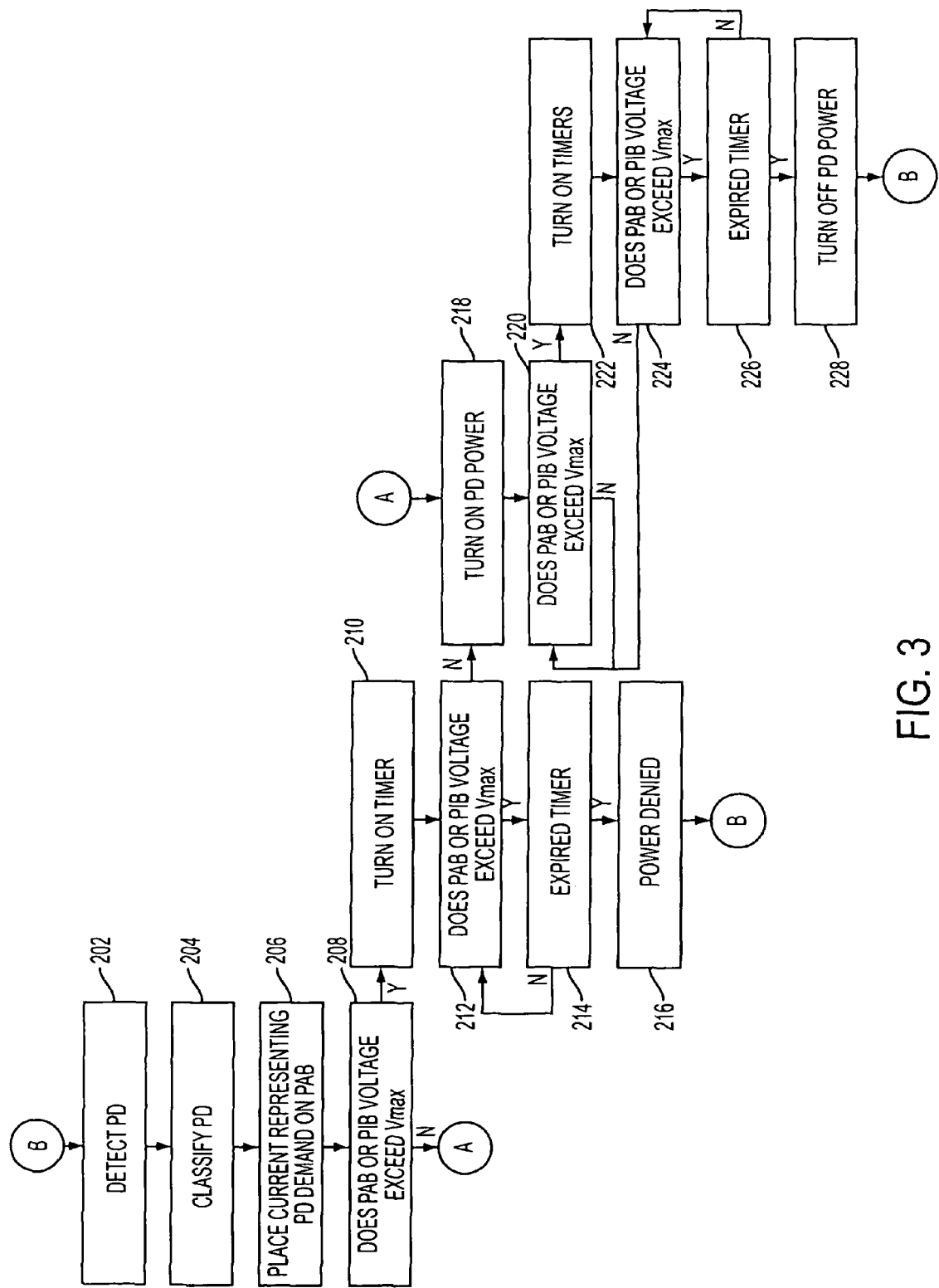
FIG. 3 is an exemplary flow-chart illustrating power management operations of the present disclosure.

Referring to FIG. 3 that shows an exemplary flow-chart of operations performed by the power management mechanism 100, when a PD is connected to a PSE port via an Ethernet link, the respective PSE channel conducts a detection procedure (step 202) by checking the PD detection signature to determine whether it is valid or non-valid. The valid and non-valid detection signatures are defined in the IEEE 802.3af standard. While the valid PD detection signature indicates that the PD is in a state where it will accept power via the PoE link, the non-valid PD detection signature indicates that the PD is in a state where it will not accept power.

If the signature is valid, the PSE channel performs a PD classification procedure to classify the detected PD (step 204). As defined in the IEEE 802.3af standard, the classification of a PD may be carried out by applying voltage and measuring current. Based on the measured current $I_{Class}$, a PD may be classified as class 0 to class 4. A PD of class 1 demands at least 4.0 W, a PD of class 2 demands at least 7.0 W, and a PD of class 0, 3 or 4 demands at least 15.4 W.

Based on the determined class of the PD, the port controller 110 via the bus logic 112 controls the current source 114 to produce current representing the power demand from the detected PD (step 206). This current supplied to the PAB 102 is converted into a voltage by the resistor Rpab increasing the total bus voltage applied to an input of the comparator 118. The total PAB voltage is compared with the voltage Vmax applied to another input of the comparator 118 (step 208) to determine whether the allocated power defined by the total PAB voltage exceeds the maximum available power of the multi-port power supply system.

At the same time, the comparator 116 compares the voltage on the PIB 104 with the voltage Vmax. As discussed above, the PIB voltage produced across the resistor Rpib represents the total power being actually used by all PDs linked to the multi-port power supply system. Hence, the comparator 116 determines whether the total power being used by the PDs exceeds the maximum power of the multi-port power supply system.

Via the bus logic 112, the output signals of the comparators 116 and 118 are supplied to the port controller 110. If the PAB voltage or PIB voltage exceeds the voltage Vmax, the port controller determines that the allocated power or actually used power exceeds the maximum power available from the multi-channel power supply system. In this case, the port controller 110 initiate turning on a timer associated with the PSE port linked to the detected PD (step 210). A time interval defined by the timer depends on the priority of the respective PSE port. A longer time interval of the timer corresponds to a higher priority of the PSE port. If the PAB voltage or PIB voltage exceeds the voltage Vmax when the time interval defined by the timer (steps 214 and 216) expires, the power requested by the detected PD is denied (step 216). Steps 202-212 may be repeated after a random back-off period.

If neither PAB voltage nor PIB voltage exceeds the voltage Vmax in step 208 or 212, the port controller 110 initiate turning on the switch 122 to provide the requested power to the detected PD via the respective PoE link (step 218). Hence, the management mechanism 100 may monitor the allocated power and used power to make a decision as to whether or not a newly detected PD should be provided with power.

Further, the power management mechanism 100 operations monitors whether the PAB voltage or PIB voltage exceeds the voltage Vmax (step 220) to remove power from one or more lower-priority PDs if the allocated power or used power exceeds the maximum power of the power supply system. In particular, when the PAB voltage or PIB voltage exceeds the Vmax level, timers associated with PDs are turned on (step 222).

If the PAB voltage or PIB voltage still exceeds the Vmax level when a time period of timers associated with one or more lower-priority PoE ports expires (steps 224, 226), the port controllers 110 corresponding to these ports turn off the switches 122 to remove power from the lower-priority ports (step 228). Thereafter, the power management mechanism 100 continues monitoring the PAB and PIB voltages to remove power from one or more lower-priority ports among remaining powered ports, if the PAB voltage or PIB voltage still exceeds the Vmax level.

Accordingly, the power management mechanism 100 enables the multi-channel power supply system to dynamically supply power to selected PoE ports and/or remove power from selected ports based on priorities of the ports. The power management mechanism 100 of the present disclosure may be utilized in a PSE that meets power requirements defined in the IEEE 802.3af standard, as well as in a high-power PSE capable of supporting PDs requesting higher power than a regular PSE is required to provide.

If power supply conditions change, the value of resistor Rpab and/or resistor Rpib may be modified, and/or current may be added to the PAB 102 and/or PIB 104 or subtracted from the PAB 102 and/or PIB 104 to modify power management operations in accordance with changed conditions. For instance, if the ambient temperature of the power supply system goes up, and the power supply rating goes down because of the raise in temperature, the power supply system may compensate for changed conditions by adding current to the PAB 102 and/or PIB 104 which would effectively lower the maximum available power of the power supply system. If this causes the PAB or PIB voltage to rise above the Vmax level, the priority scheme described above would remove power from PoE ports based on their priorities until the allocated power and used power fall to the new limit.

One skilled in the art would realize that the value of resistor Rpab and/or resistor Rpib may be modified, and/or current may be added to or subtracted from the PAB 102 and/or PIB 104 to effectively lower or raise the available power for any other reason, for example, when a UPS power system takes over in the event of a utility failure, or when cooling fans in the power supply system or air conditioning within the power supply facility fails.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A power supply system comprising:
   multiple power supply ports for providing power to respective powered devices via multiple communication links,
   a power-in-use bus shared by the multiple power supply ports, the power-in-use bus being configured for receiving a power-in-use signal representing total amount of power being used by the powered devices, and
   multiple port control circuits corresponding to the multiple power supply ports and responsive to the power-in-use signal for controlling supply of power to the respective powered devices.

2. The system of claim 1, wherein a port control circuit of the multiple port control circuits is configured for removing power supplied to a respective powered device when the power-in-use signal exceeds a preset usage threshold level.

3. The system of claim 1, wherein a port control circuit of the multiple port control circuits is configured for denying a request for power from a respective powered device when the power-in-use signal exceeds a preset usage threshold level.

4. The system of claim 1, wherein each of the power supply ports is assigned with a priority corresponding to a priority of a respective powered device.

5. The system of claim 4, wherein the ports control circuits being configured for controlling supply of power based on priorities assigned to the associated power supply ports.

6. The system of claim 5, further comprising a power allocation bus shared by the multiple power supply ports and configured for receiving a power allocation signal representing a total amount of power allocated for the powered devices.

7. The system of claim 6, wherein the multiple ports control circuits are responsive to the power allocation signal for controlling supply of power to the respective powered devices.

8. The system of claim 7, wherein a port control circuit of the multiple port control circuits is configured for removing power supplied to a respective powered device when the power allocation signal exceeds a preset allocation threshold level.

9. The system of claim 7, wherein a port control circuit of the multiple port control circuits is configured for denying a request for power from a respective powered device when the power allocation signal exceeds a preset allocation threshold level.

10. The system of claim 7, wherein the multiple ports control circuits are configured to control supply of power to the respective powered devices based on the priorities assigned to the associated ports.

11. The system of claim 7, wherein the power-in-use bus is coupled to a power-in-use impedance common for the multiple power supply ports.

12. The system of claim 11, wherein the power allocation bus is coupled to a power allocation impedance common for the multiple power supply ports.

13. The system of claim 12, wherein a value of the power allocation impedance is set smaller than the value of the power-in-use impedance.

14. The system of claim 7, further comprising a signal modification mechanism for modifying the power-in-use signal in response to an event.

15. The system of claim 7, further comprising a signal modification mechanism for modifying the power allocation signal in response to an event.

16. A Power over Ethernet (PoE) system comprising:
multiple PoE ports for supplying power to respective powered devices, the ports being assigned with priorities corresponding to priorities of the respective powered devices,
a power indication bus shared by the multiple PoE ports, the bus being configured to receive a power indication signal indicating total power associated with the powered devices, and
multiple port control circuits corresponding to the multiple power supply ports and responsive to the power indication signal for controlling supply of power to the respective powered devices in accordance with the priorities of the powered devices.

17. The system of claim 16, wherein the power indication signal includes a power-in-use signal representing total power being used by the powered devices.

18. The system of claim 17, wherein the power indication signal further includes a power allocation signal representing total power allocated to the powered devices.

19. A method of supplying power from multiple power supply ports to respective powered devices over communication links, comprising the steps of:
detecting a powered device linked to a power supply port of the multiple power supply ports,
determining amount of power demanded by the powered device,
placing a power demand signal representing the demanded power onto a power allocation bus shared by the multiple power supply ports,
determining a priority of the detected powered device,
detecting on the power allocation bus, a total power allocation signal representing a total amount of power allocated to the powered devices, and
based on the detected total power allocation signal, controlling supply of power to the powered device by a port control circuit corresponding to the power supply port,
if the total power allocation signal exceeds a preset power allocation threshold level, denying a request for power from the detected powered device after expiration of a time interval corresponding to the priority of the detected powered device.

20. The method of claim 19 further including the steps of:
detecting on a power-in-use bus shared by the multiple power supply ports, a power-in-use signal representing a total amount of power being used by the powered devices, and
if the power-in-use signal exceeds a preset power-in-use threshold level, denying the request for power from the detected powered device after expiration of the time interval corresponding to the priority of the detected powered device.

21. A method of supplying power from multiple power supply ports to respective powered devices over communication links, comprising the steps of:
detecting on a power-in-use bus shared by the multiple power supply ports, a power-in-use signal representing a total amount of power being used by the powered devices, and
based on the detected power-in-use signal. controlling supply of power to the respective powered devices by multiple port control circuits corresponding to the multiple power supply ports,
if the power-in-use signal exceeds a preset power-in-use threshold level, removing power supplied to a powered device having a lowest priority among powered device currently supplied with power.

22. The method of claim 21 further comprising the steps of:
detecting on a power allocation bus shared by the multiple power supply ports, a total power allocation signal representing a total amount of power allocated to the powered devices, and
if the total power allocation signal exceeds a preset power allocation threshold level, removing power supplied to the powered device having the lowest priority.

23. The method of claim 22, wherein the power is removed after expiration of a time interval corresponding to the priority of the powered device.

* * * * *